(12) United States Patent
Yamamoto et al.

(10) Patent No.: US 11,131,561 B2
(45) Date of Patent: Sep. 28, 2021

(54) VEHICLE POSITION MANAGEMENT SYSTEM AND VEHICLE POSITION MANAGEMENT METHOD

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 0 days.

(21) Appl. No.: 16/960,905

(22) PCT Filed: Jan. 11, 2019

(86) PCT No.: PCT/JP2019/000715
§ 371 (c)(1),
(2) Date: Jul. 9, 2020

(87) PCT Pub. No.: WO2019/142737
PCT Pub. Date: Jul. 25, 2019

(65) Prior Publication Data
US 2020/0340825 A1    Oct. 29, 2020

(30) Foreign Application Priority Data

Jan. 16, 2018    (JP) .............................. JP2018-004790

(51) Int. Cl.
*G08G 1/042*    (2006.01)
*G01C 21/00*    (2006.01)

(52) U.S. Cl.
CPC ......... *G01C 21/3833* (2020.08); *G08G 1/042* (2013.01)

(58) Field of Classification Search
CPC .................................................. G01C 21/3833
See application file for complete search history.

(56) References Cited

U.S. PATENT DOCUMENTS 10,417,834 B2 *    9/2019    Buchheim ............ G07B 15/063
10,573,093 B2 *    2/2020    Breed .................... G07C 5/008
(Continued)

FOREIGN PATENT DOCUMENTS

JP    2001-028095 A    1/2001
JP    2001028095 A *    1/2001
(Continued)

OTHER PUBLICATIONS

International Search Report for corresponding Application No. PCT/JP2019/000715, dated Apr. 16, 2019.

*Primary Examiner* — Shelley Chen
(74) *Attorney, Agent, or Firm* — Renner, Otto, Boisselle & Sklar, LLP

(57) ABSTRACT

A vehicle position management method includes granting an information acquisition right, which is a right to receive support information helpful for driving vehicle, when upload information including marker identification information which identifies detected magnetic marker is acquired from vehicle side capable of detecting magnetic marker laid in a road, providing vehicle to which the information acquisition right has been granted with the support information, and identifying and managing a position of vehicle associated with the upload information based on a laying position of magnetic marker identified by the marker identification information included in the upload information.

15 Claims, 21 Drawing Sheets

(56) References Cited

U.S. PATENT DOCUMENTS

2002/0027511 A1\* 3/2002 Horita .............. G08G 1/096716
                                                    340/988
2005/0079013 A1\* 4/2005 Raaijmakers ........... E01F 9/582
                                                    404/9
2017/0108859 A1    4/2017 Xu
2017/0127230 A1\* 5/2017 Enriquez ............... H04W 4/021
2018/0281854 A1\* 10/2018 Talamonti ............. G01S 13/931
2019/0098468 A1    3/2019 Yamamoto
2019/0163990 A1\* 5/2019 Mei ........................ G01C 21/32

FOREIGN PATENT DOCUMENTS

| JP | 2003-151083 A |   | 5/2003 |
|----|---------------|---|--------|
| JP | 2012-043134 A |   | 3/2012 |
| JP | 2012043134 A | \* | 3/2012 |
| WO | 2017/187881 A1 |   | 11/2017 |

\* cited by examiner

[FIG. 1]
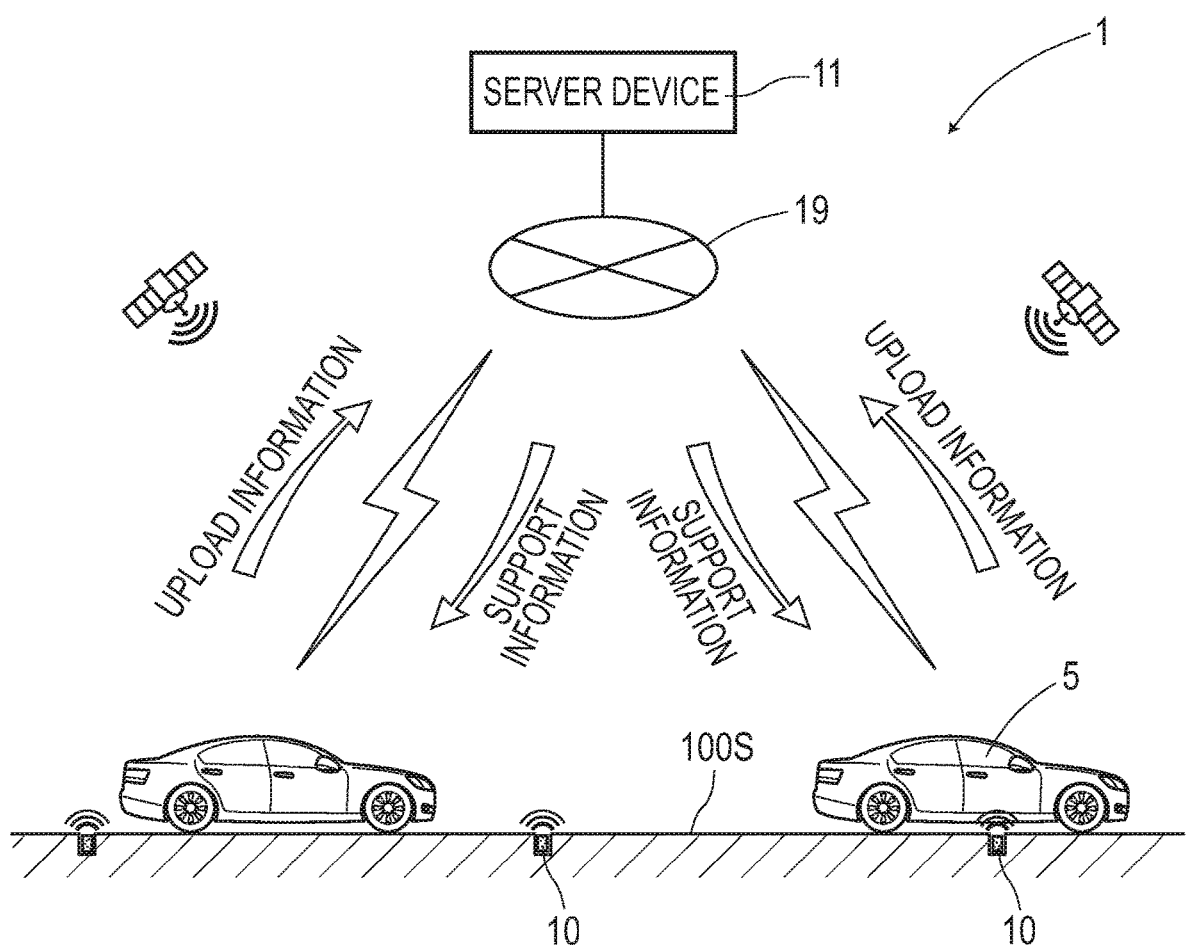

[FIG. 2]
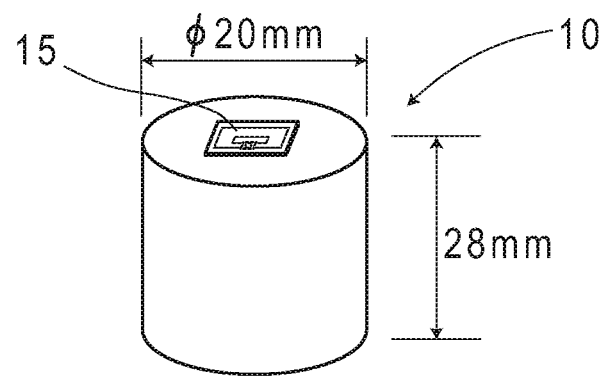

[FIG. 3]
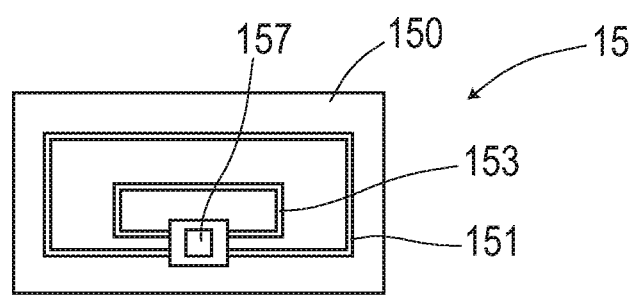

[FIG. 4]
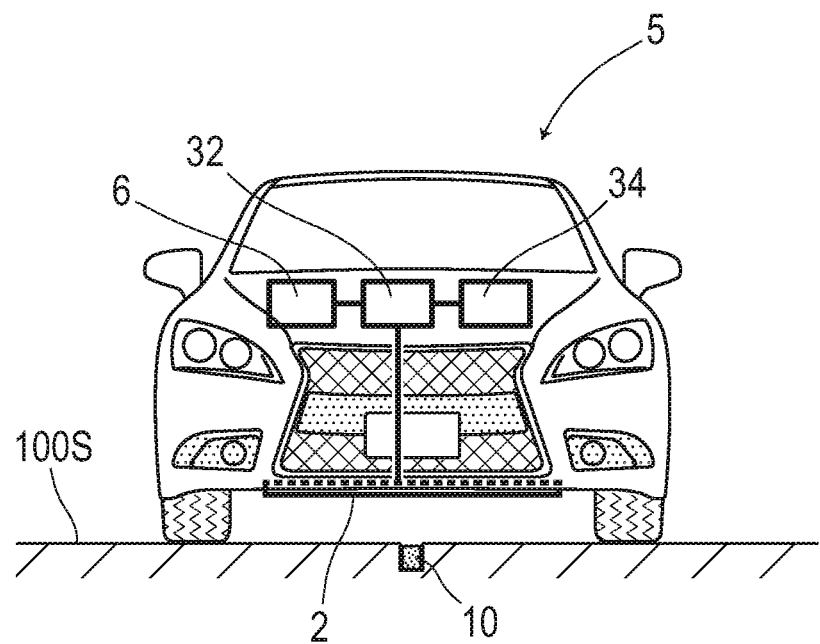

[FIG. 5]
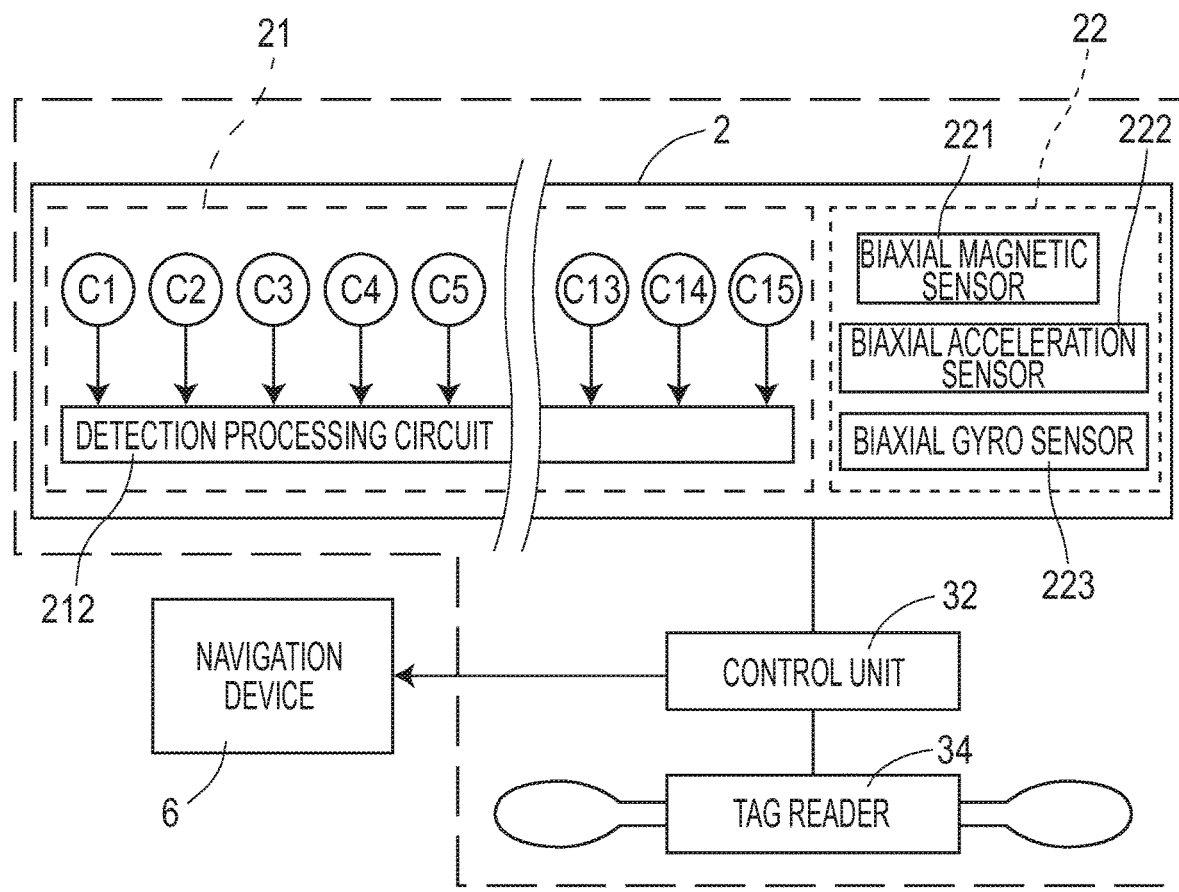

[FIG. 6]
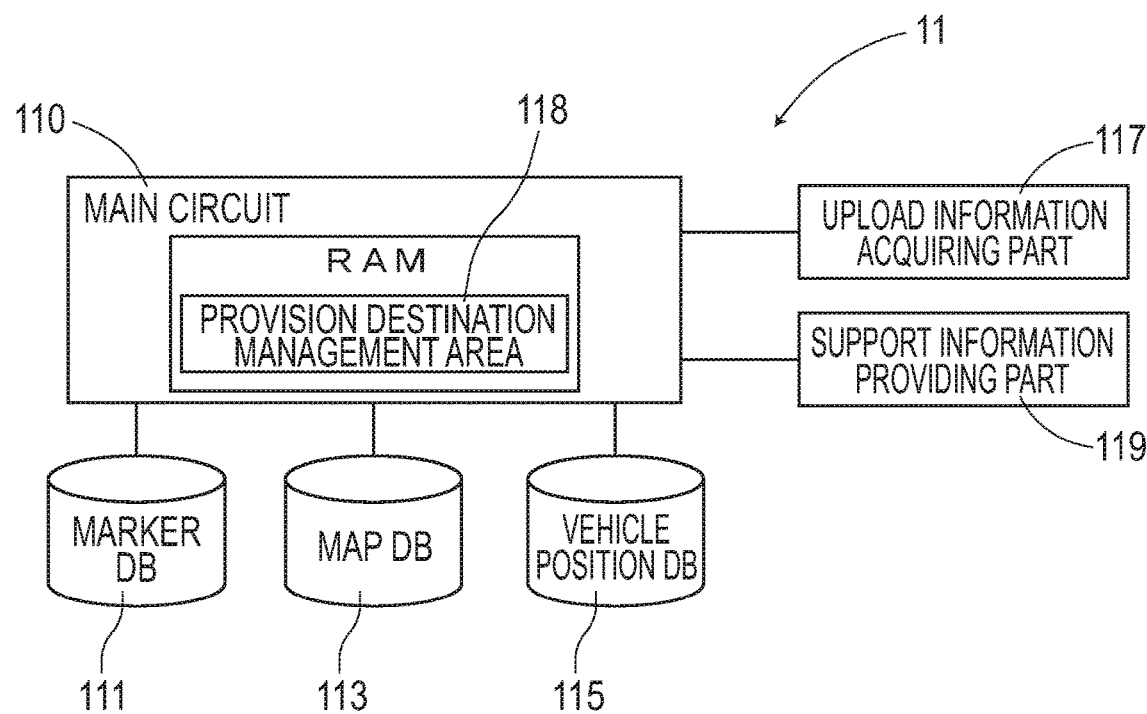

[FIG. 7]
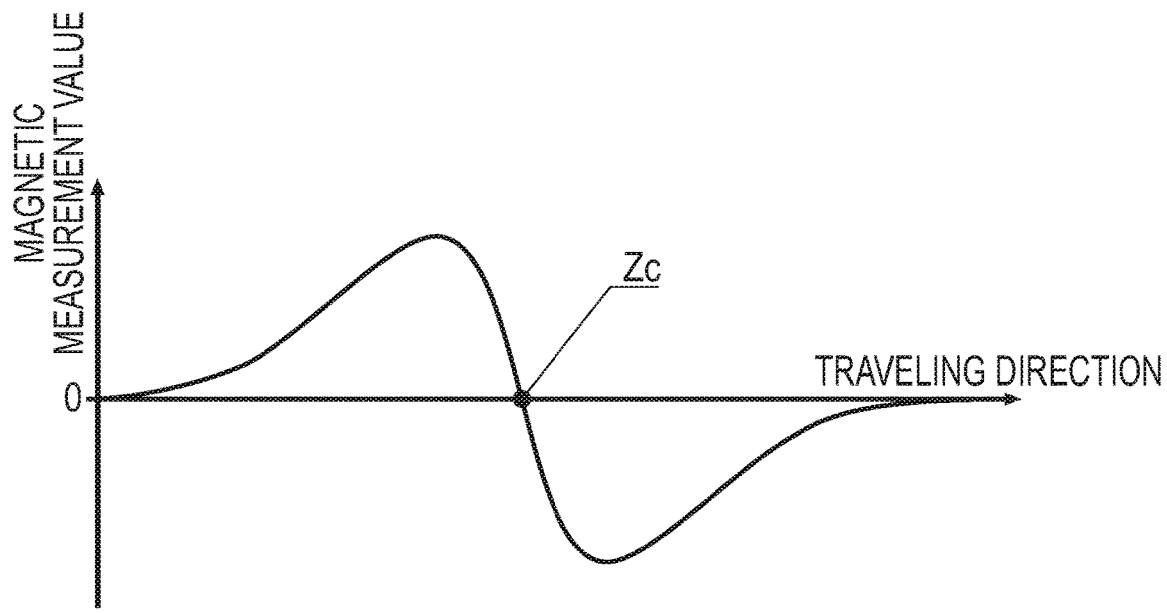

[FIG. 8]
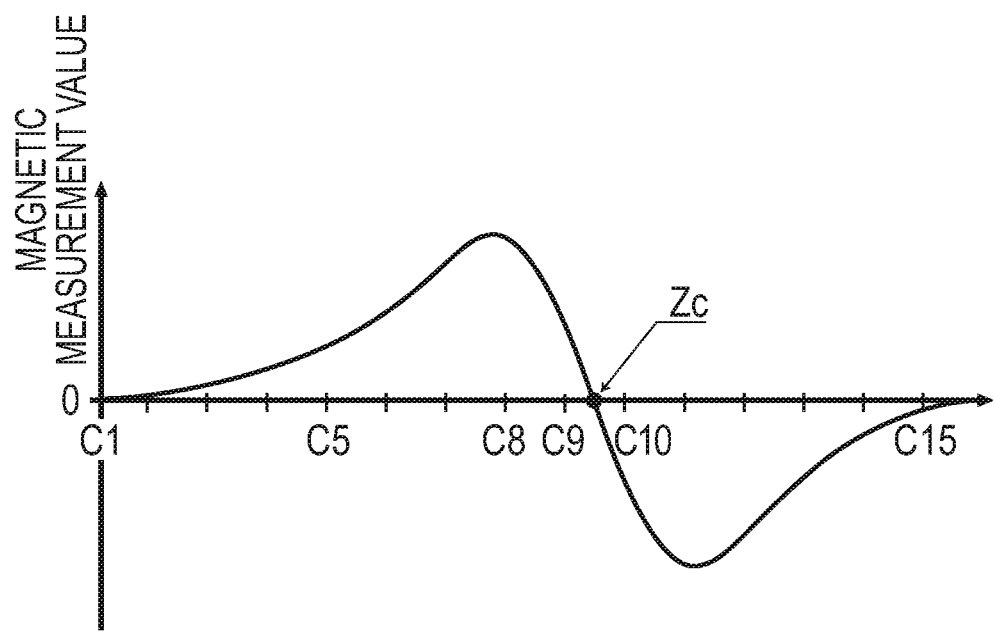

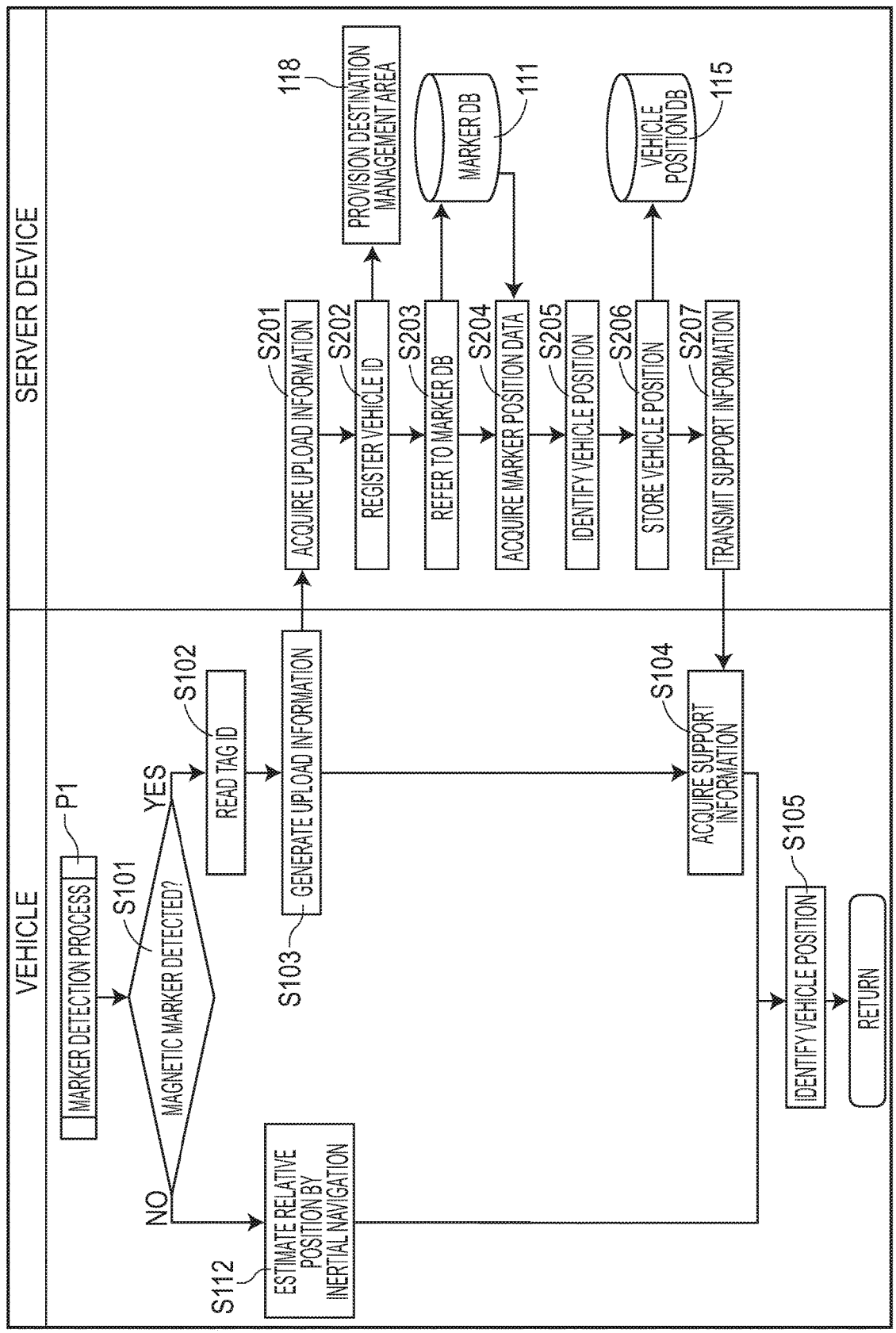
[FIG. 9]

[FIG. 10]

| VEHICLE ID | TIME | VEHICLE POSITION | |
|---|---|---|---|
| | | AREA | LATITUDE / LONGITUDE |
| A3012AS88 | 00,25 | A1 | 35.285755/ 137.137200 |
| B0781YP60 | 04,30 | C3 | 36.126651/ 139.126289 |
| A5521AC27 | 14,20 | F2 | 39.510127/ 138.172601 |
| ⋮ | ⋮ | ⋮ | ⋮ |

10:01:00 ~ 10:01:59
10:02:00 ~ 10:02:59
10:03:00 ~ 10:03:59

[FIG. 11]
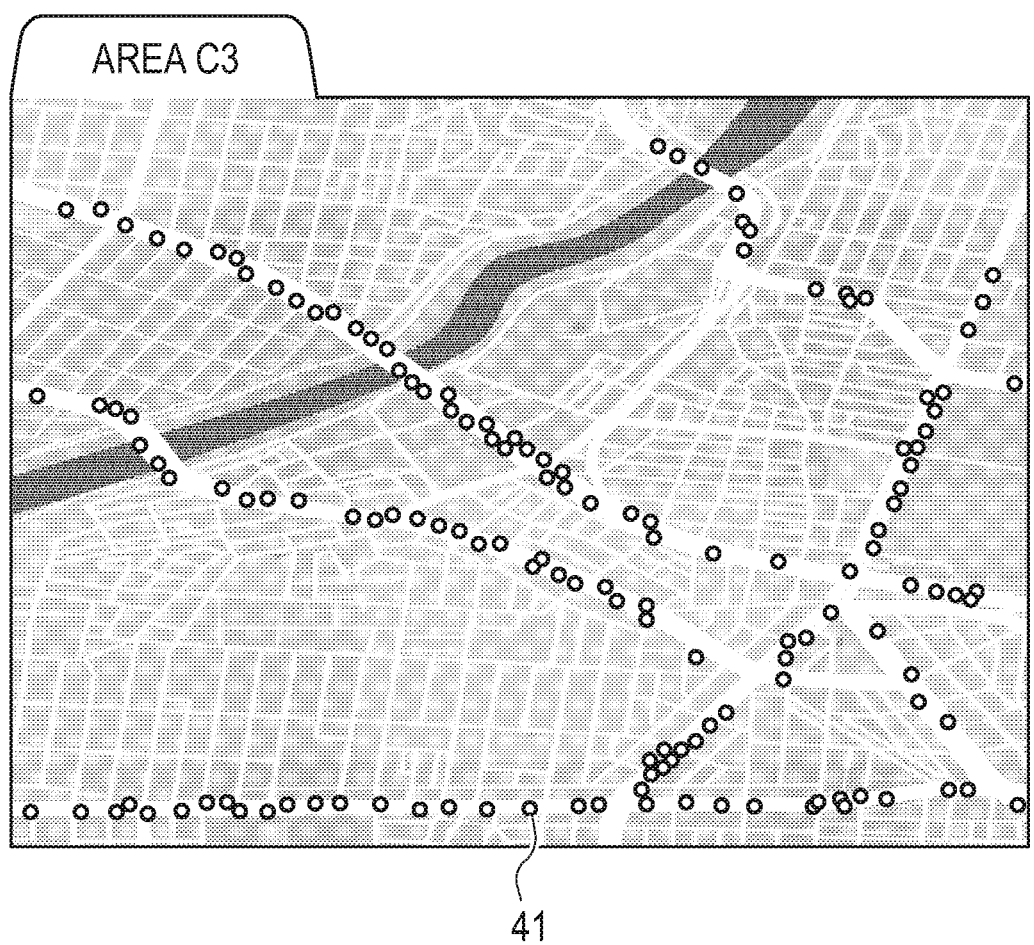

[FIG. 12]
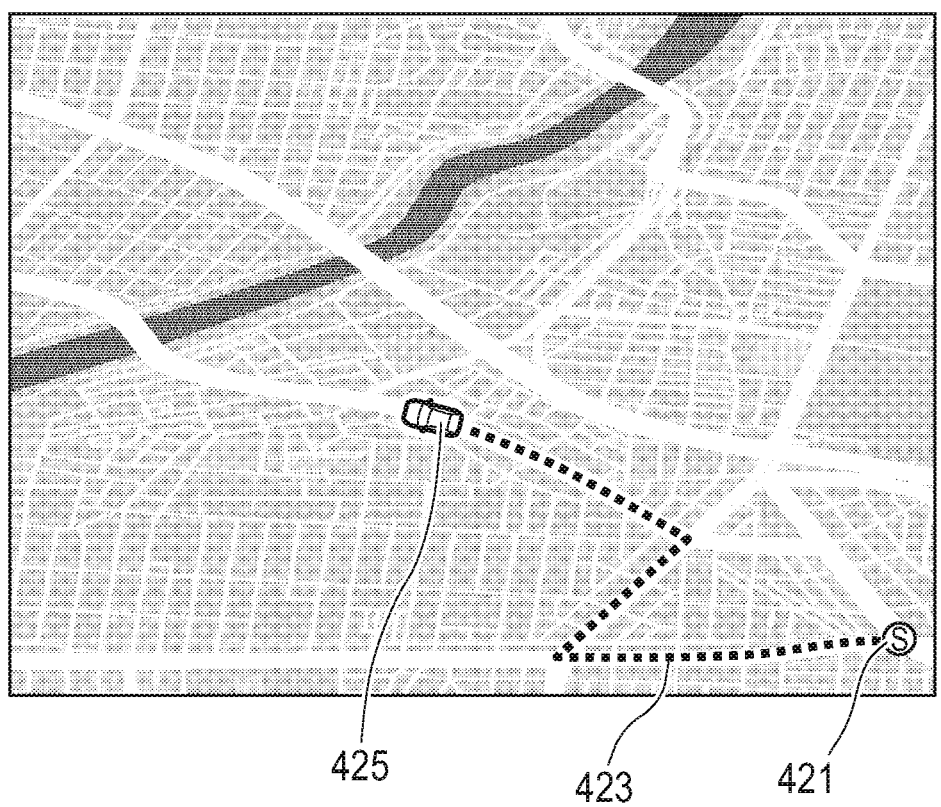

[FIG. 13]
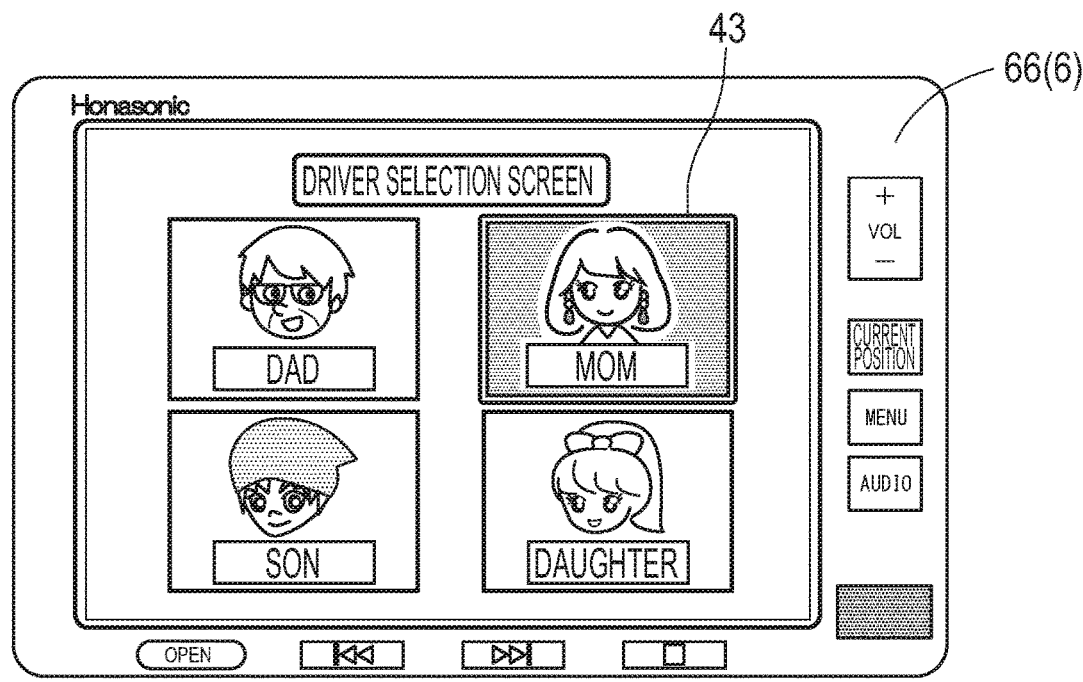

[FIG. 14]
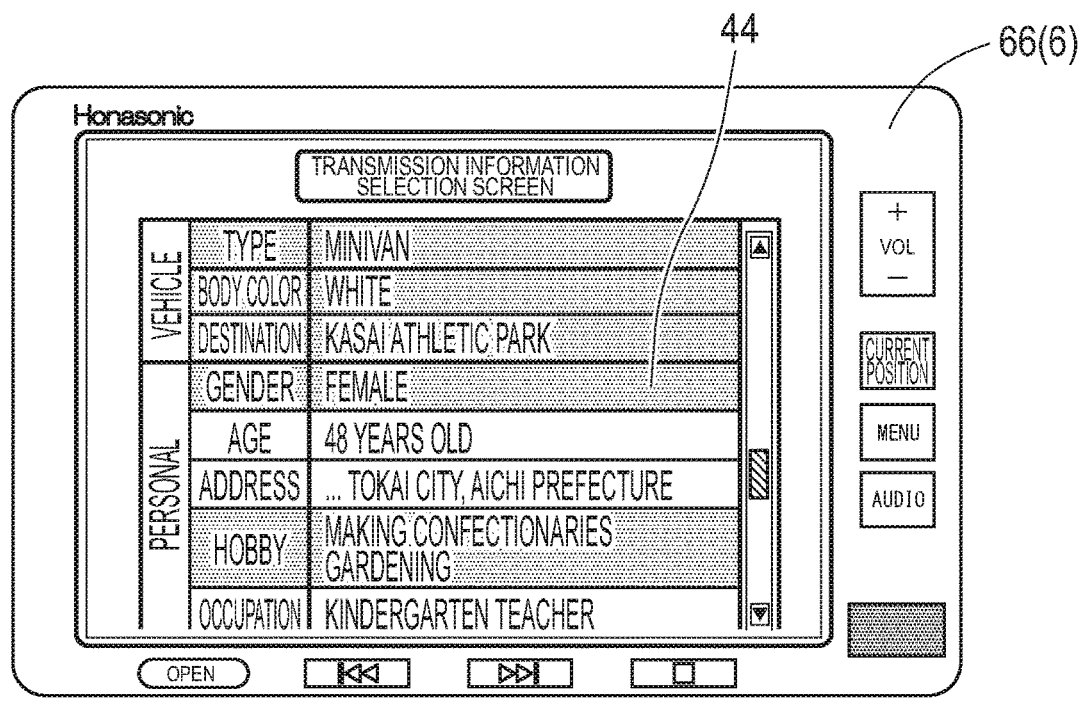

[FIG. 15]

AREA A5

| BUSINESS ENTITY ID | NAME | LOCATION (LATITUDE/ LONGITUDE) | BUSINESS TYPE | TARGET GROUP | COMMENT | ADDRESS AND TELEPHONE NO. |
|---|---|---|---|---|---|---|
| abababab | Cafe☆Star | 35.385756/ 137.557200 | COFFEE SHOP CAFE | F1 (FEMALES AGED 20 TO 34 YEARS) | SPONGY PANCAKES EQUIPPED WITH SOFAS, CHILDREN ARE WELCOME COUPON AVAILABLE | 1-1, TOKAI CITY, AICHI PREFECTURE 052-000-0000 |
| cdcdcdcd | flower MAI | 36.126651/ 139.126289 | FLOWER SHOP | F2 (FEMALES AGED 35 TO 49 YEARS) | SMALL FLORIST IN TOWN ARRANGE FLOWERS ACCORDING TO YOUR BUDGET LOCAL DELIVERY AVAILABLE | 1-2, TOKAI CITY, AICHI PREFECTURE 052-000-1111 |
| ghghghgh | BAIKADO | 35.510127/ 138.172601 | TEA SHOP SWEETS | F2 (FEMALES AGED 35 TO 49 YEARS) | ESTABLISHED IN 1897 ENJOY OUR SEASONAL JAPANESE-STYLE CONFECTIONARY TEA CORNER AVAILABLE | 2-1, TOKAI CITY, AICHI PREFECTURE 052-000-2222 |
| opopopop | FITNESS STUDIO WILL | 37.200124/ 136.652301 | SPORTS | M2 (MALES AGED 35 TO 49 YEARS) | FITNESS & BOXING GYM AVAILABLE EARLY IN MORNING AND LATE AT NIGHT EQUIPPED WITH PARKING LOT FREE TRIAL AVAILABLE! | 2-2, TOKAI CITY, AICHI PREFECTURE 052-000-3333 |
| . . . . . . | | | | | | |

| VEHICLE ID | TIME | VEHICLE POSITION | | ATTRIBUTES | | | | | | |
|---|---|---|---|---|---|---|---|---|---|---|
| | | AREA | LATITUDE / LONGITUDE | VEHICLE TYPE | VEHICLE BODY COLOR | DESTINATION | GENDER | AGE | HOBBY | OCCUPATION |
| A3012AS88 | 00,25 | A1 | 35.285755/ 137.137200 | — | — | KASAI ATHLETIC PARK | FEMALE | 48 | MAKING CONFECTIONARIES GARDENING | — |
| B0781YP60 | 04,30 | C3 | 36.126651/ 139.126289 | — | — | AICHI TOWER BUILDING | MALE | 28 | GAMING | OFFICE WORKER |
| A5521AC27 | 14,20 | F2 | 39.510127/ 138.172601 | SEDAN | SILVER | AICHI PREFECTURAL GOVERNMENT OFFICE | — | — | — | — |

| VEHICLE ID | INFORMATION ID OF UPLOAD INFORMATION | INFORMATION INCLUDED IN UPLOAD INFORMATION OTHER THAN TAG ID | SUPPORT INFORMATION FLAG |
|---|---|---|---|
| A3012AS88 | awme17892 | NONE | 0 |
| B0781YP60 | nwem84328 | DESTINATION INFORMATION | 1 |
| A5521AC27 | maen83925 | GENDER, AGE, HOBBY | 3 |
| A4293AR39 | omdf74823 | VEHICLE TYPE, VEHICLE BODY COLOR | 2 |
| B7231KN87 | ireh22914 | NONE | 0 |
| C2247CE46 | weyr38475 | DESTINATION INFORMATION | 1 |
| ⋮ | ⋮ | ⋮ | ⋮ |

[FIG. 18]
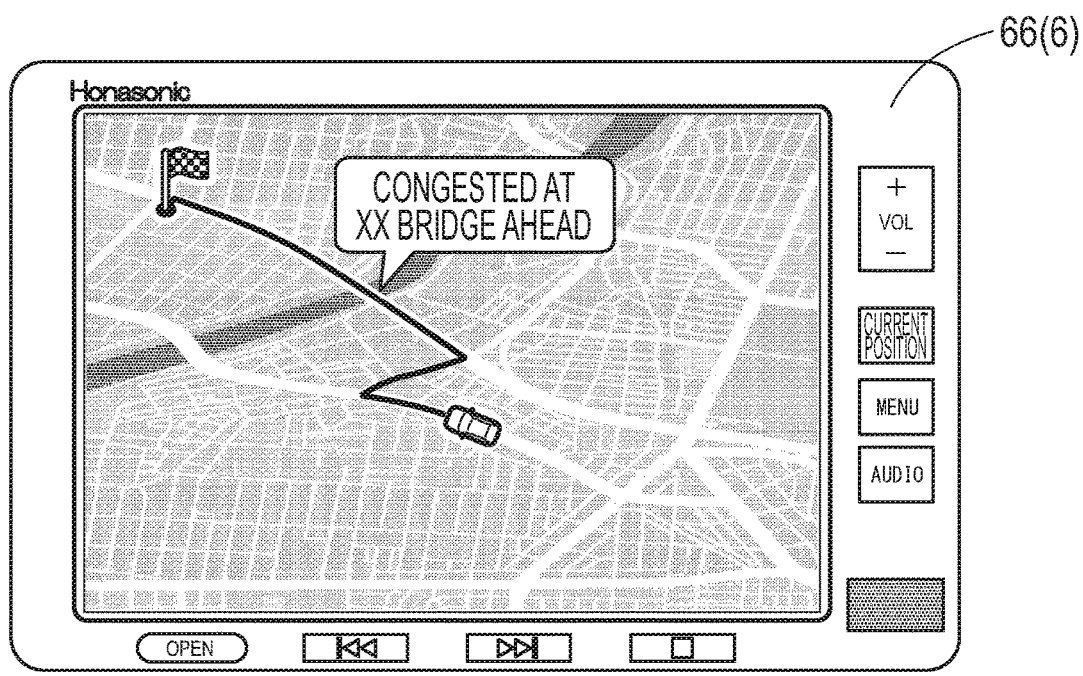

[FIG. 19]
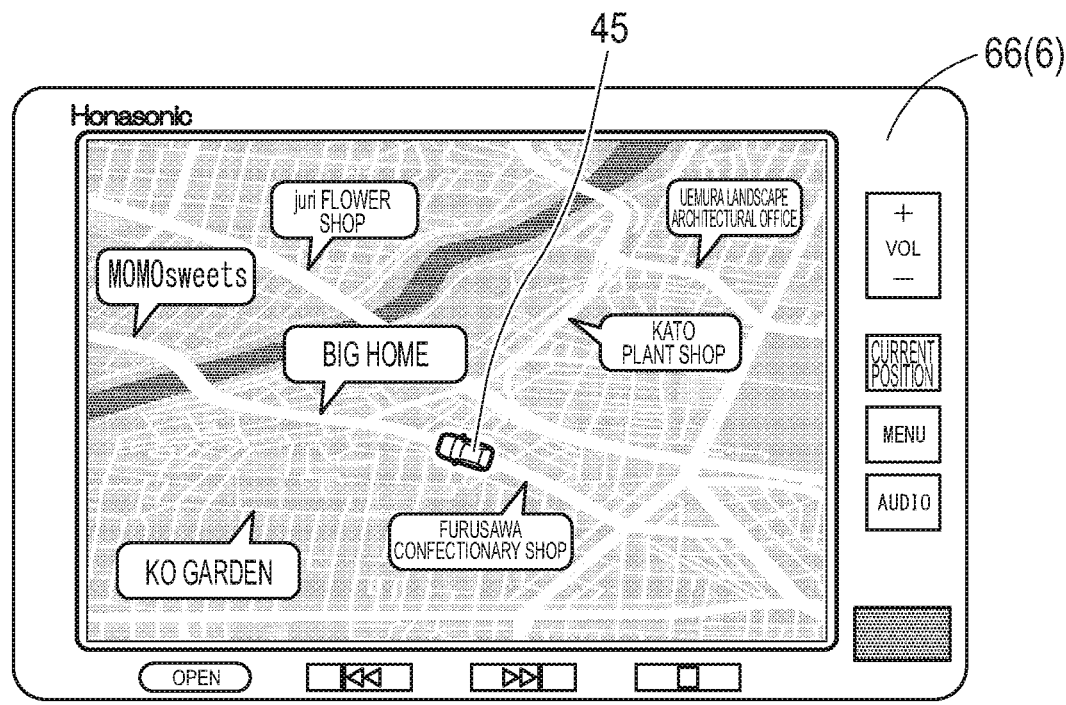

[FIG. 20]
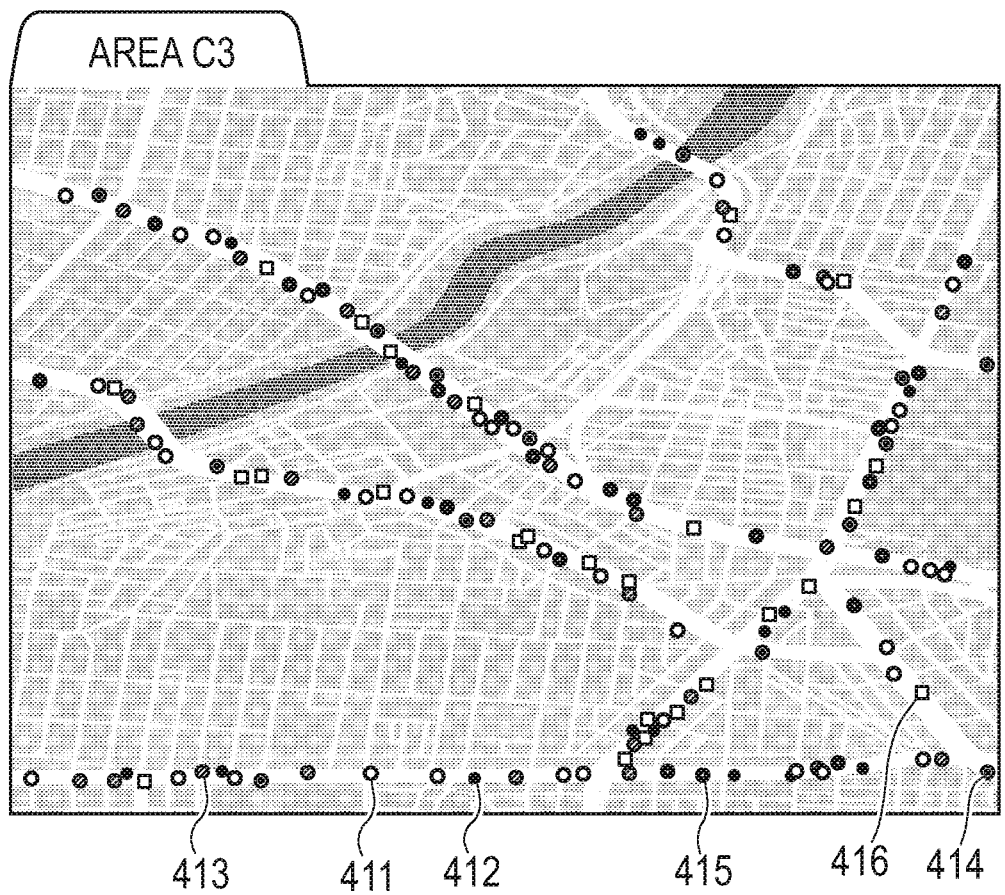

[FIG. 21]
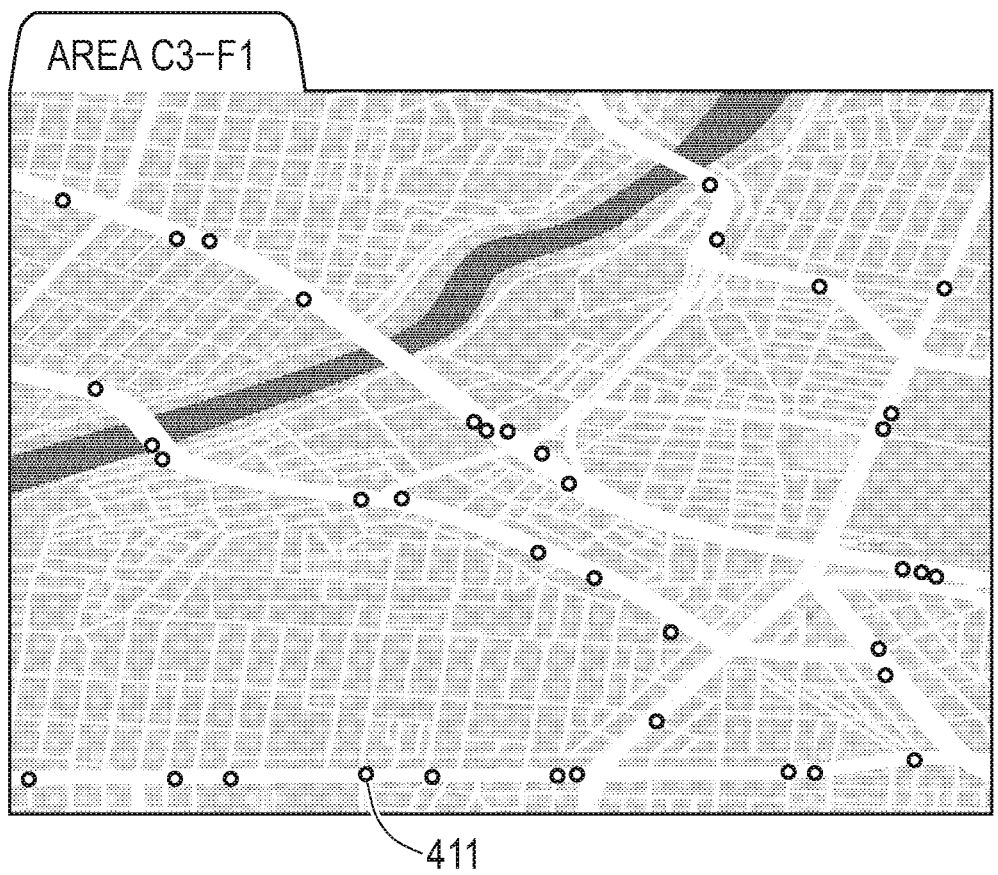

VEHICLE POSITION MANAGEMENT SYSTEM AND VEHICLE POSITION MANAGEMENT METHOD

TECHNICAL FIELD

The present invention relates to a vehicle position management system and a vehicle position management method for managing the positions of vehicles.

BACKGROUND ART

Conventionally, for example, a system for managing the positions of vehicles such as taxicabs has been known (for example, refer to Patent Literature 1). This system tries to achieve quick dispatching by associating (mapping) the position of each vehicle on a map.

CITATION LIST

Patent Literature

Patent Literature 1: Japanese Unexamined Patent Application Publication No. 2003-151083

SUMMARY OF INVENTION

Technical Problem

However, the above-described conventional system has the following problem. That is, there is a problem in which while it is possible to generate a useful vehicle map that is helpful for predicting congestion and so forth if the positions of general vehicles can be grasped, unlike business vehicles such as taxicabs manageable on a system side, it is not easy to acquire general vehicles' positions.

The present invention was made in view of the above-described conventional problem, and is to provide a vehicle position management system and a vehicle position management method targeted for general vehicles.

Solution to Problem

One aspect of the present invention resides in a vehicle position management system including:

an information providing part which provides a vehicle with support information helpful for driving the vehicle;

a right granting part which grants an information acquisition right, which is a right to receive provision of the support information, to the vehicle;

a marker database which stores marker position information indicating a laying position of a magnetic marker, as being linked to marker identification information, the marker identification information identifying the magnetic marker laid in a road; and a vehicle position identifying part which identifies a position of the vehicle by using the marker position information stored in the marker database, wherein the right granting part, when upload information including the marker identification information which identifies the magnetic marker detected is acquired from a vehicle side detecting the magnetic marker, grants the information acquisition right to the vehicle associated with the upload information and the information providing part provides the vehicle to which the information acquisition right has been granted with the support information, and the vehicle position identifying part identifies the position of the vehicle associated with the upload information with reference to the laying position indicated by the marker position information to which the marker identification information included in the upload information is linked, among the marker position information stored in the marker database.

One aspect of the present invention resides in a vehicle position management method for managing a position of a vehicle, including:

granting, when upload information including marker identification information which identifies a magnetic marker detected is acquired from a vehicle side capable of detecting the magnetic marker laid in a road, an information acquisition right, which is a right to receive support information helpful for driving the vehicle and providing the vehicle to which the information acquisition right has been granted with the support information, and identifying and managing the position of the vehicle associated with the upload information based on a laying position of the magnetic marker identified by the marker identification information included in the upload information.

Advantageous Effects of Invention

In the present invention, when the upload information including the marker identification information of the magnetic marker is acquired, the information acquisition right is granted to the vehicle of the transmission source of the upload information to provide support information. In this invention, in return for providing the support information, the marker identification information can be acquired from the vehicle side, and the magnetic marker detected by the vehicle can be identified. If the magnetic marker detected by the vehicle is known, the position of the vehicle can be identified with reference to the laying position of that magnetic marker.

According to the present invention, by providing the support information, each vehicle can be motivated to transmit the upload information including the marker identification information. Therefore, in the present invention, the position of each vehicle can be relatively easily acquired, and the position of each vehicle can be efficiently managed.

BRIEF DESCRIPTION OF DRAWINGS

FIG. 1 is a diagram of the configuration of a vehicle position management system in the first embodiment.

FIG. 2 is a perspective view depicting a magnetic marker in the first embodiment.

FIG. 3 is a front view of an RFID tag in the first embodiment.

FIG. 4 is a descriptive diagram depicting a state in which a vehicle detects the magnetic marker in the first embodiment.

FIG. 5 is a block diagram depicting the configuration of a vehicle side in the first embodiment.

FIG. 6 is a block diagram depicting the configuration of a server device in the first embodiment.

FIG. 7 is a descriptive diagram exemplarily depicting changes of a magnetic measurement value in a traveling direction at the time of passing over the magnetic marker in the first embodiment.

FIG. 8 is a descriptive diagram exemplarily depicting a distribution of magnetic measurement values in a vehicle-width direction by magnetic sensors Cn arrayed in the vehicle-width direction in the first embodiment.

FIG. 9 is a flow diagram depicting a flow of operation of the vehicle position management system in the first embodiment.

FIG. 10 is a descriptive diagram exemplarily depicting vehicle position data stored in a vehicle position DB in the first embodiment.

FIG. 11 is a descriptive diagram exemplarily depicting a vehicle map in which positions of vehicles are mapped on the map in the first embodiment.

FIG. 12 is a descriptive diagram exemplarily depicting a route map depicting a traveling route of a specific vehicle in the first embodiment.

FIG. 13 is a descriptive diagram exemplarily depicting a driver selection screen in the second embodiment.

FIG. 14 is a descriptive diagram exemplarily depicting a transmission information selection screen in the second embodiment.

FIG. 15 is a descriptive diagram exemplarily depicting town information stored in a town information DB in the second embodiment.

FIG. 16 is a descriptive diagram exemplarily depicting vehicle position data stored in a vehicle position DB in the second embodiment.

FIG. 17 is a descriptive diagram depicting the configuration of recording data of a provision destination management area in the second embodiment.

FIG. 18 is a descriptive diagram exemplarily depicting a display screen of congestion information by a vehicle onboard display in the second embodiment.

FIG. 19 is a descriptive diagram exemplarily depicting a display screen of town information by the vehicle onboard display in the second embodiment.

FIG. 20 is a descriptive diagram exemplarily depicting a vehicle map in which positions of vehicles are mapped on the map in the second embodiment.

FIG. 21 is a descriptive diagram exemplarily depicting a vehicle map in which positions of vehicles are partially mapped on the map in the second embodiment.

DESCRIPTION OF EMBODIMENTS

Embodiments of the present invention are specifically described by using the following examples.

First Embodiment

The present embodiment is an example regarding vehicle position management system 1 and a vehicle position management method for managing the position of vehicle 5. Vehicle position management system 1 identifies the position of each vehicle 5 by using upload information transmitted from each vehicle 5 to server device 11, and generates, for example, a vehicle map in which the position of vehicle 5 is associated with (mapped on) the map. Details of this are described by using FIG. 1 to FIG. 12.

Vehicle position management system 1 is configured of, as in FIG. 1, a combination of vehicle 5 connectable to a public communication line such as Internet 19 and server device 11 which provides support information to vehicle 5. This vehicle position management system 1 is operated by taking, as a target, a road where magnetic markers 10 having RFID (Radio Frequency IDentification) tag 15 (FIG. 2) integrally retained are laid.

In the following, after (1) magnetic marker 10 is generally described, (2) vehicle 5 and (3) the server device 11 configuring vehicle position management system 1 are described. Subsequently, (4) operational details of vehicle position management system 1 are described.

(1) Magnetic Marker

Magnetic marker 10 is a road marker configured of a columnar magnet having a diameter of 20 mm and a height of 28 mm, with RFID tag 15 affixed to its end face, as in FIG. 2. Magnetic marker 10 is accommodated, for example, in each of holes bored with 10-meter pitches along the center of a lane divided by left and right lane marks.

The magnet forming magnetic marker 10 is a ferrite plastic magnet with magnetic powder of iron oxide as a magnetic material dispersed in a polymer material as a base material, and has a characteristic of a maximum energy product (BHmax)=6.4 kJ/m$^3$. This magnetic marker 10 makes magnetism act with a magnetic flux density of 8 µT (microtesla) at a maximum height (250 mm) in a range from 100 mm to 250 mm assumed as an attachment height of measurement unit 2 (refer to FIG. 4) on vehicle 5 side.

On magnetic marker 10, as in FIG. 2, RFID tag 15 is laminated and arranged on the end face oriented upward when laid. RFID tag 15 as one example of a wireless tag operates by wireless external power feeding, and externally outputs a tag ID (one example of marker identification information) as unique identification information via wireless communication. Here, as described above, the magnet of magnetic marker 10 has magnetic powder of iron oxide dispersed in the polymer material. This magnet has low conductivity and eddy current and so forth hardly occur at the time of wireless power feeding. Thus, RFID tag 15 annexed to the magnetic marker 10 can efficiently receive wirelessly-transmitted electric power.

RFID tag 15 is an electronic part having IC chip 157 implemented on the surface of tag sheet 150 cut out from, for example, a PET (Polyethylene terephthalate) film as in FIG. 3. On the surface of tag sheet 150, a printed pattern of loop coil 151 and antenna 153 is provided. Loop coil 151 is a power-receiving coil in which exciting current occurs by external electromagnetic induction. Antenna 153 is a transmission antenna for wirelessly transmitting position data and so forth.

(2) Vehicle

Vehicle 5 includes, as in FIG. 4, measurement unit 2, tag reader 34, control unit 32, and a communication unit (not depicted) including a wireless communication function. Furthermore, vehicle 5 includes navigation device 6 which performs route guidance to a destination. Vehicle 5 can make a wireless connection to the public communication line via the communication unit. Vehicle 5 transmits upload information to server device 11 via the communication unit, and receives provision of support information from server device 11.

Measurement unit 2 is a unit with sensor array (one example of a detection unit) 21 which detects any magnetic marker 10 and IMU (Inertial Measurement Unit) 22 for achieving inertial navigation integrated together as in FIG. 4 and FIG. 5. Measurement unit 2 forming a long stick shape in a vehicle-width direction is attached, for example, to the inside of the front bumper of vehicle 5 or the like, in a state of facing road surface 100S. In the case of vehicle 5 of the present embodiment, the attachment height of measurement unit 2 with reference to road surface 100S is 200 mm.

Sensor array 21 included in measurement unit 2 includes fifteen magnetic sensors Cn (n is an integer from 1 to 15) arrayed on a straight line along the vehicle-width direction and detection processing circuit 212 having incorporated therein a CPU and so forth not depicted. In this sensor array 21, fifteen magnetic sensors Cn are equidistantly arranged with 10-centimeter pitches.

Magnetic sensors Cn are sensors which detect magnetism by using the known MI effect (Magneto Impedance Effect) in which the impedance of a magneto-sensitive body such as an amorphous wire sensitively changes in response to the external magnetic field. In each magnetic sensor Cn, the magneto-sensitive bodies such as amorphous wires not depicted are arranged along two directions orthogonal to each other, thereby allowing detection of magnetism acting in the two directions orthogonal to each other. Note in the present embodiment that magnetic sensors Cn are incorporated in sensor array 21 so as to be able to detect magnetic components in the traveling direction and the vehicle-width direction.

Magnetic sensors Cn are highly-sensitive sensors having a measurement range of the magnetic flux density of ±0.6 mT and a magnetic flux resolution of 0.02 μT within the measurement range. To support high-speed traveling of vehicle 5, each magnetic sensor Cn performs magnetic measurement in a cycle of 3 kHz.

Here, as described above, magnetic marker 10 can make magnetism act with a magnetic flux density equal to or larger than 8 μT in a range from 100 mm to 250 mm assumed as the attachment height of magnetic sensors Cn. With magnetic marker 10 making magnetism act with a magnetic flux density equal to or larger than 8 μT, detection can be made with high reliability by using magnetic sensors Cn with the magnetic flux resolution of 0.02 μT.

Detection processing circuit 212 (FIG. 5) of sensor array 21 is an arithmetic circuit which performs a marker detection process for detecting any magnetic marker 10. This detection processing circuit 212 is configured by using a CPU (central processing unit) which performs various computations as well as memory elements such as a ROM (read only memory) and a RAM (random access memory), and so forth.

Detection processing circuit 212 acquires a sensor signal outputted from each of magnetic sensors Cn in a cycle of 3 kHz to perform a marker detection process, and inputs the detection result to control unit 32. Although details will be described further below, in this marker detection process, in addition to the result of detection of magnetic marker 10, a lateral shift amount of vehicle 5 with respect to detected magnetic marker 10 is measured.

IMU 22 incorporated in measurement unit 2 is an inertial navigation unit which estimates a relative position of vehicle 5 by inertial navigation. IMU 22 includes biaxial magnetic sensor 221 as an electronic compass which measures an azimuth, biaxial acceleration sensor 222 which measures acceleration, and biaxial gyro sensor 223 which measures angular velocity. IMU 22 uses the measured acceleration, angular velocity and so forth to compute the relative position with respect to a reference position.

Tag reader 34 included in vehicle 5 is a communication unit which wirelessly communicates with RFID tag 15 (FIG. 2) laminated and arranged on the end face of columnar-shaped magnetic marker 10. Tag reader 34 forming one example of a marker identification information acquisition unit wirelessly transmits electric power required for operation of RFID tag 15, and receives information transmitted from RFID tag 15. The transmission information of RFID tag 15 includes the tag ID as identification information (marker identification information) of RFID tag 15. Note that tag reader 34 may be incorporated in the measurement unit 2 for integration.

Control unit 32 included in vehicle 5 is a unit for controlling measurement unit 2 and tag reader 34 as well as identifying an own vehicle position as the position of vehicle 5 on a real-time basis. This control unit 32 includes an electronic board (not depicted) having implemented thereon a CPU which performs various computations as well as memory elements such as a ROM and a RAM.

A method of identifying the own vehicle position by control unit 32 is different when vehicle 5 arrives at the laying position of any magnetic marker 10 and when vehicle 5 is positioned in the middle of adjacent magnetic markers 10. Although details will be described further below, in the former case, control unit 32 identifies the own vehicle position by using support information provided from server device 11 at the time of detection of any magnetic marker 10. On the other hand, in the latter case, the own vehicle position is identified based on the relative position of vehicle 5 estimated by inertial navigation. Control unit 32 inputs the own vehicle position in navigation device 6 which performs, for example, route guidance to the destination or the like.

(3) Server Device

Server device 11 is an arithmetic operation processing device which includes, as in FIG. 6, main circuit 110 configured of an electronic board not depicted with a CPU implemented thereon and so forth and, to this main circuit 110, a storage device not depicted such as a hard disk is connected. In main circuit 110, a communication function supporting a LAN (Local Area Network) not depicted is provided. Server device 11 is connectable to the public communication line such as Internet 19 via a communication cable connected to a LAN port (refer to FIG. 1). Server device 11 includes upload information acquiring part (information acquiring part) 117 which acquires upload information from each vehicle 5 via the public communication line such as Internet 19 and support information providing part (information providing part) 119 which distributes support information to each vehicle 5 similarly.

In server device 11, by using storage areas of the storage device connected to main circuit 110, marker database (marker DB) 111, map database (map DB) 113, and vehicle position database (vehicle position DB) 115 are provided. Marker DB 111 is a database having marker position data (marker position information) of magnetic markers 10 stored therein. Map DB 113 is a database having map data stored therein. Vehicle position DB 115 is a database having vehicle position data for each time zone stored therein. Furthermore, for example, in a storage area of main circuit 110 configured of, for example, a RAM (Random Access Memory) or the like, provision destination management area 118 is provided for managing a vehicle ID as identification information of vehicle 5 which has acquired a right to receive provision of support information.

(4) Operation of Vehicle Position Management System

Regarding details of the operation of the above-configured vehicle position management system 1, (a) marker detection process by vehicle 5 is first described with reference to FIG. 7 and FIG. 8. Subsequently, with reference to a flow diagram of FIG. 9, (b) upload information transmission process by vehicle 5 and (c) support information transmission process by server device 11 are described. Furthermore, (d) data configuration of the vehicle position DB and (e) vehicle map generation process are described.

(a) Marker Detection Process by Vehicle 5

While vehicle 5 is traveling a road, sensor array 21 (FIG. 5) of measurement unit 2 repeatedly performs marker detection process for detecting any magnetic marker 10.

As described above, magnetic sensors Cn (FIG. 5) can measure magnetic components in the traveling direction and the vehicle-width direction of vehicle 5. For example, when these magnetic sensors Cn move in the traveling direction to pass directly above any magnetic marker 10, the magnetic measurement value in the traveling direction has its sign reversed before and after magnetic marker 10 as in FIG. 7 and changes so as to cross zero at a position directly above magnetic marker 10. Therefore, during traveling of vehicle 5, when zero-cross Zc occurs in which the sign of magnetism in the traveling direction detected by any magnetic sensor Cn is reversed, it can be determined that measurement unit 2 is positioned directly above magnetic marker 10. Detection processing circuit 212 (FIG. 5) determines that magnetic marker 10 is detected when measurement unit 2 is positioned directly above magnetic marker 10 and zero-cross Zc of the magnetic measurement value in the traveling direction occurs as described above.

Also, for example, as for a magnetic sensor with the same specification as that of magnetic sensors Cn, assume movement along a virtual line in the vehicle-width direction passing directly above magnetic marker 10. In this case, the magnetic measurement value in the vehicle-width direction has its sign reversed on both sides across magnetic marker 10 and changes so as to cross zero at a position directly above magnetic marker 10. In the case of measurement unit 2 having fifteen magnetic sensors Cn arrayed in the vehicle-width direction, as in the example of FIG. 8, the sign of magnetism in the vehicle-width direction to be detected by any magnetic sensor Cn varies depending on which side the sensor is present with respect to magnetic marker 10.

Based on the distribution of FIG. 8 exemplarily depicting magnetic measurement values of respective magnetic sensors Cn of measurement unit 2 in the vehicle-width direction, an intermediate position between adjacent two magnetic sensors Cn across zero-cross Zc where the sign of magnetism in the vehicle-width direction is reversed or a position directly below magnetic sensor Cn where the detected magnetism in the vehicle-width direction is zero and the signs of magnetic sensors Cn on both outer sides are reversed is the position of magnetic marker 10 in the vehicle-width direction. Detection processing circuit 212 measures a deviation of the position of magnetic marker 10 in the vehicle-width direction with respect to the center position (position of magnetic sensor C8) of measurement unit 2 as a lateral shift amount of vehicle 5 with respect to magnetic marker 10. For example, in the case of FIG. 8, the position of zero-cross Zc is a position corresponding to C9.5 in the neighborhood of a midpoint between C9 and C10. As described above, since the pitch between magnetic sensors C9 and C10 is 10 centimeters, the lateral shift amount of vehicle 5 with respect to magnetic marker 10 is (9.5−8)×10 centimeters with reference to C8 positioned at the center of measurement unit 2 in the vehicle-width direction.

(b) Upload Information Transmission Process

As in FIG. 9, when sensor array 21 of vehicle 5 performs the above-described marker detection process to detect any magnetic marker 10 (S101: YES), tag reader 34 performs tag ID reading process for reading the tag ID of RFID tag 15 (S102). Tag reader 34 wirelessly transmits electric power required for operation of RFID tag 15 to start the operation of RFID tag 15 and receives transmission data (such as the tag ID) of RFID tag 15. Then, tag reader 34 inputs the tag ID received by this tag data reading process to control unit 32. Control unit 32 generates upload information including the tag ID (S103), and transmits to server device 11 the generated information with the vehicle ID as identification information of vehicle 5 linked thereto.

(c) Support Information Transmission Process

As in FIG. 9, upon receiving the upload information from vehicle 5 side (S201), server device 11 first records the vehicle ID linked to the upload information in provision destination management area 118, thereby registering vehicle 5 as a transmission source of the upload information in a provision destination of support information (S202). With this registration of the provision destination of the support information, server device 11 as a right granting part grants an information acquisition right, which is the right to receive support information, to vehicle 5. Note that to the vehicle ID recorded in provision destination management area 118, an information ID is linked, which is an identification code of the upload information.

Server device 11 refers to marker DB 111 having the marker position data (marker position information) of each magnetic marker 10 stored therein (S203). From among the marker position data stored in marker DB 111, server device 11 selectively acquires marker position data of magnetic marker 10 related to the tag ID included in the upload information (S204). Then, with reference to the laying position of magnetic marker 10 indicated by this marker position data, the vehicle position of the transmission source of the upload information is identified (S205, vehicle position identifying part). Server device 11 sequentially stores the vehicle positions identified in this manner in vehicle position DB 115 (S206). Note that the data configuration of the vehicle position DB will be described later.

Here, server device 11 of the present embodiment handles the laying position of magnetic marker 10 itself as a vehicle position. For example, the above-described lateral shift amount measured by vehicle 5 may be included in the upload information. In this case, on server device 11 side, the laying position of magnetic marker 10 can be corrected with this lateral shift amount, and the position after correction can be identified as a vehicle position.

Server device 11 generates support information including the marker position data acquired from marker DB 111. Then, server device 11 transmits this support information to vehicle 5, which is the transmission source of the upload information acquired at the above-described step S201 and has acquired the information acquisition right (S207). Specifically, from among the vehicle IDs recorded in provision destination management area 118 as described above, the vehicle ID with the information ID of the upload information acquired at the above-described step S201 linked thereto is selected, and the support information is provided to vehicle 5 related to this vehicle ID. Note that the vehicle ID recorded in provision destination management area 118 is deleted in response to provision of the support information.

When provided with the support information including the marker position data from server device 11 (S104), control unit 32 of vehicle 5 identifies the vehicle position with reference to the laying position of magnetic marker 10 indicated by this marker position data (S105). Specifically, with reference to the laying position of magnetic marker 10, computation is performed to offset the position by the lateral shift amount measured by measurement unit 2 in the above-described manner, thereby finding the vehicle position. For example, navigation device 6 with the vehicle position inputted from control unit 32 handles this vehicle position as the own vehicle position and performs route guidance and so forth.

Note that in a traveling section after any magnetic marker 10 is detected until new magnetic marker 10 is detected (S101: NO), control unit 32 estimates the relative position of vehicle 5 by inertial navigation by taking the vehicle position at the time of detection of magnetic marker 10 as a reference position (S112). Specifically, IMU 22 (FIG. 5) incorporated in measurement unit 2 performs second-order integration of the measurement acceleration by biaxial acceleration sensor 222 (FIG. 5) to compute a displacement amount, and further performs computation of integrating displacement amounts along a forwarding azimuth of vehicle 5 measured by biaxial gyro sensor 223 (FIG. 5) and so forth. With this, control unit 32 estimates the relative position of vehicle 5 with respect to the above-described reference position. Then, a position acquired by moving from the reference position by this relative position is identified as the own vehicle position (S105).

(d) Data Configuration of Vehicle Position DB 115

Vehicle position DB 115 is, as in FIG. 10, a database for recording vehicle position data such as latitudes and longitudes as being divided for each time zone of, for example, one minute. Recorded in vehicle position DB 115 are the vehicle ID linked to the upload information as a trigger for identifying the vehicle position, upload information reception time, and area information to which the vehicle position belongs to, in association with the vehicle position data. Note that the vehicle position data for each time may be recorded as being divided, for example, for each area.

(e) Vehicle Map Generation Process

Server device 11 forming one example of a map generating part generates a vehicle map by using stored data in map DB 113 and vehicle position DB 115. As the vehicle map to be generated by server device 11, there are a distribution map representing a distribution of vehicles 5 and a route map representing a previous traveling route of vehicle 5. The distribution map is generated for each time zone of, for example, one minute. The route map is generated targeted for, for example, vehicle 5 specified by the vehicle ID.

(e1) Distribution Map

To generate the distribution map in the specified time zone for the specified area, server device 11 reads map data of the specified area from map DB 113 and also reads vehicle position data in the specified time zone from vehicle position DB 115 (FIG. 10). Then, from among the read vehicle position data, vehicle position data in the specified area is extracted.

Server device 11 associates (maps) vehicle positions indicated by the extracted vehicle position data on a map based on the read map data, thereby generating, for example, the distribution map of FIG. 11. Circle marks 41 in the drawing represent respective vehicles 5. This distribution map is useful for grasping, for example, a traffic volume. According to this distribution map, a traffic situation such as, for example, a congestion situation, can be grasped. Also, this distribution map is useful for congestion prediction by grasping the number of vehicles 5 flowing into a location, such as a bridge, where vehicles 5 concentrate. And, based on the grasping result or prediction result of the congestion situation, for example, it is possible to provide vehicle 5 side with information for guiding so as to prevent vehicle 5 from entering a congested location, thereby making it possible to aid in mitigation and avoidance of congestion.

(e2) Route Map

To generate a route map of, for example, specific vehicle 5, server device 11 reads time-series vehicle position data to which the corresponding vehicle ID is linked from vehicle position DB 115 recording the vehicle position data for each time zone (refer to FIG. 10). Then, an area where that time-series vehicle position data is distributed, that is, an area configuring the route of vehicle 5, is identified, and map data corresponding to that area is read from map DB 113.

As in FIG. 12, on the map based on the read map data, server device 11 displays a dotted line 425 by taking the oldest one among the vehicle positions indicated by the vehicle position data as a starting point (circled S mark 421 in the drawing) and the latest one as an end point (vehicle icon 425 in the drawing), thereby displaying a history of a traveling route.

For example, the route map is helpful for grasping a traveling route of specific vehicle 5 and analyzing a traveling pattern. For example, if the traveling pattern is known, support information regarding service desired by a driver (driving person) can be provided at appropriate timing. Also, for example, if the driving time exceeds two hours or so, information that urges the driver to take a rest is included in the support information. In this manner, it is possible to take measures for preventing accidents and so forth due to fatigue before they happen.

As described above, by transmitting the upload information including the tag ID of detected magnetic marker 10, each vehicle 5 using vehicle position management system 1 can acquire the right to receive provision of support information. Each vehicle 5 receiving provision of the support information including the marker position data can accurately identify the position of the own vehicle base on the laying position of magnetic marker 10.

On a system side such as server device 11 configuring vehicle position management system 1, by providing the support information to each vehicle 5, it is possible to acquire, from each vehicle 5 detecting magnetic marker 10, the tag ID of that magnetic marker 10. If the tag ID of magnetic marker 10 detected by each vehicle 5 is known, the position of each vehicle 5 can be easily grasped.

In this manner, in the vehicle position management system and the vehicle position management method of the present embodiment, a reward on vehicle 5 side is set in which support information provision can be received. Thus, the upload information including the tag ID can be relatively easily collected from vehicle 5 side. If the upload information including the tag ID is collected from vehicle 5 side, the position of each vehicle 5 can be accurately grasped.

Note that exemplarily depicted in the present embodiment is server device 11 integrally including support information providing part 119 which provides support information to vehicle 5 side, marker DB 111 storing the marker position data indicating the laying position of each magnetic marker 10, and the vehicle position identifying part which identifies the position of vehicle 5. The functions of server device 11 of the present embodiment may be implemented by a plurality of devices. The plurality of devices may be remotely set as long as they are communicably connected via the public communication line such as the Internet, a dedicated communication line, or the like.

Second Embodiment

The present embodiment is an example in which a configuration based on the vehicle position management system of the first embodiment is changed so as to allow attribute information on a vehicle side to be collected.

In this vehicle position management system, various types of service information helpful for driving are set so as to be able to motivate drivers to upload more information. On the vehicle side, in accordance with the type, combination and so forth of information to be externally outputted as upload information, an information acquisition right to receive provision of support information including various types of service information can be acquired. Details of this are described with reference to FIG. 13 to FIG. 21.

In each vehicle supporting the vehicle position management system of the present embodiment, an attribute database (attribute DB, not depicted) capable of storing attribute information of vehicles and drivers in advance is provided to a control unit. Also, the control unit can display an attribute input screen (not depicted) for the attribute information and a driver selection screen (FIG. 13) for selecting a driver as well as a transmission information selection screen (FIG. 14) for setting transmission information of the attribute information to be included in the upload information and so forth on vehicle onboard display 66.

As attribute input screens (not depicted), there are a screen for inputting vehicle information as vehicle attribute information and a screen for inputting personal information as individual attribute information regarding each driver. On the attribute input screen regarding vehicles, it is possible to input information regarding vehicles including a vehicle type such as minivan, sedan, coupe, or SUV; a vehicle body color; and a model year. On the attribute input screen regarding drivers, it is possible to input personal information including gender, age, hobby, and occupation. The attribute information inputted via these attribute input screens is stored in the attribute DB. Note that information about the destination in the route guidance among the vehicle information is automatically inputted while the route guidance by navigation device 6 is being performed.

The driver selection screen (selection operating part) exemplarily depicted in FIG. 13 is an example of a screen where, for example, a father, a mother, a son, and a daughter each having a driver's license are displayed among family members configuring a family having a vehicle. For example, when the mother is to drive, by touching inside corresponding display frame 43 for operation, she (mother) can be set as a driver. With the driver thus selected, by control from the control unit, the display screen on vehicle onboard display 66 is switched to the transmission information selection screen of FIG. 14.

The transmission information selection screen (selection operating part) exemplarily depicted in FIG. 14 is a selection screen supporting, for example, the mother as a driver selected on the driver selection screen (FIG. 13). On this transmission information selection screen, in addition to the vehicle information such as the vehicle type, vehicle body color, and destination in the route guidance, the personal information of the driver selected on the driver selection screen is selectably displayed. When any display frame is touched for operation, that display frame 44 is switched to hatching by control of the control unit, and its corresponding information is set as transmission information. Note that if display frame 44 on hatching is touched again for operation, setting can be released, and external transmission of the corresponding information can be stopped.

Next, a server device includes an information generation function of generating service information useful for driving by using a distribution map, and also includes a database storing various information helpful for driving. The server device can provide service information based on the information stored in the database, service information generated based on the distribution map, and so forth as being included in the support information. Also in the server device of the present embodiment, the configuration of a vehicle position DB is different from that of the first embodiment.

As the information generation function included in the server device, there is a function of generating congestion information. By using, for example, the distribution map of vehicles for each area in FIG. 11 referred to in the first embodiment, the server device identifies or predicts a congestion section, and generates congestion information representing that position and the degree of congestion.

As databases, there are a town information database (town information DB) storing town information as information of a town including a shop advertisement, a traffic information database (traffic information DB) storing information regarding traffic such as a construction section, and so forth.

In the town information DB, for example, as in FIG. 15, product and service providers and so forth are managed with business entity IDs as identification information, and information regarding the providers and so forth is stored as being divided for each area. As information regarding the providers and so forth, there are information, data, and so forth including a name, location (latitude/longitude), business type, target group assumed as customers, comment, and location (address).

In the traffic information DB (not depicted), for example, information regarding traffic such as the construction section and a restricted section (traffic information) is managed. In the traffic information DB, the traffic information is managed in association with location information indicating the corresponding locations. Note that the above-described congestion information may be stored in the traffic information DB as occasion demands.

The vehicle position DB (FIG. 16) is different from the configuration of the first embodiment (refer to FIG. 10). In this vehicle position DB, the vehicle position data and the attribute information on the vehicle side including drivers are managed.

The server device of the present embodiment can provide the vehicle side with support information including service information such as traffic information including congestion information and town information regarding shops and so forth. In the configuration of the present embodiment, the data configuration of a provision destination management area where support information provision destinations are managed is different from that of the first embodiment so as to allow provision of support information including various types of service information.

In the provision destination management area (reference character 118 in FIG. 6) of the first embodiment, as described above, a transmission source vehicle ID with an information ID of the upload information linked thereto is recorded, thereby managing the vehicle as a support information provision destination. By contrast, in the provision destination management area of the present embodiment, as in FIG. 17, in addition to the vehicle ID, the type of transmission information transmitted as included in the upload information, a flag value corresponding to the type of transmission information, and so forth are recorded.

The flag value in the provision destination management area serves as a control code representing the type of service information to be included in support information to be provided to the vehicle side. In the present embodiment, this flag value other than a zero value represents the information acquisition right to receive provision of support information including service information as well as marker position data. Note that the flag value of a zero value represents the information acquisition right to receive provision of support information including marker position data but not including service information.

For example, the flag value of zero in the provision destination management area is a flag value set in accordance with the upload information only with a tag ID, and supports a case without service information to be included in support information. The flag value of 1 is set in accordance with upload information including destination information as well as the tag ID, and supports a case in which congestion information is included in support information as service information. The flag value of 2 is set in accordance with upload information including vehicle information such as the vehicle type and vehicle body color as well as the tag ID, and supports a case in which traffic information such as the construction section and the restricted section is included in support information as service information. The flag value of 3 is set in accordance with upload information including personal information such as gender, age, and hobby as well as the tag ID, and supports a case in which town information regarding shops, eating houses, and so forth is included in support information as service information.

Next, details of the operation of the vehicle position management system are described.

When transmitting upload information in accordance with detection of any magnetic marker, the control unit on the vehicle side transmits, for example, in addition to the tag ID of the detected magnetic marker, transmission information selected via the transmission information selection screen of FIG. 14 as being included in the upload information.

Upon receiving the upload information from the vehicle side, the server device stores the vehicle position data based on the upload information and the information included in the upload information in the vehicle position DB exemplarily depicted in FIG. 16 as occasion demands, and records the vehicle ID of the provision destination of the support information and so forth in the provision destination management area exemplarily depicted in FIG. 17 as occasion demands. For example, when the tag ID and also upload information including personal information of the driver are received, stored in the vehicle position DB of FIG. 16 is, in addition to the vehicle position data, attribute information such as gender, age, and hobby. Also, in the provision destination management area of FIG. 17, the flag value of 3 is recorded in association with the vehicle ID of the transmission source of the upload information.

Of which support information each vehicle can acquire the right (information acquisition right) to receive provision in response to transmission of the upload information varies depending on the type, combination, or the like of information to be transmitted from the vehicle side as being included in the upload information. In the present embodiment, the type of service information to be provided as being included in the support information varies depending on the type of transmission information to be included in the upload information. In the following, provision of (1) support information including congestion information, (2) support information including town information, and (3) support information including traffic information are described, by way of example.

(1) Provision of Support Information Including Congestion Information

The server device provides, for example, the vehicle with the flag value of 1 recorded in the provision destination management area (refer to FIG. 17), that is, the vehicle transmitting destination information as being included in the upload information, with support information including congestion information in addition to the marker position data. On the vehicle side receiving provision of the support information, for example, navigation device 6 preferably recalculates a route for avoiding a congestion section. Also, for example, as depicted in FIG. 18, congestion information such as "Congested at XX bridge ahead" is preferably on popup display on a map displayed on vehicle onboard display 66.

(2) Provision of Support Information Including Town Information

The server device provides, for example, the vehicle with the flag value of 3 recorded in the provision destination management area, that is, the vehicle transmitting personal information of the driver as being included in the upload information, with town information regarding a shop or the like handling a product or service related to hobby. In this town information, for example, in addition to information regarding the details of the product or service, position information indicating a location of that shop or the like is included.

Navigation device 6 of vehicles indicates, as in FIG. 19, locations of shops or the like on the map being displayed on vehicle onboard display 66, and also performs popup display of a name and so forth. When an area on popup display is touched for operation, contents of a product or service (comment information in the town information. refer to FIG. 15), address, and telephone number, and so forth are also preferably on popup display. For example, if the driver has a hobby of gardening, as for a shop or the like on a forwarding route of a vehicle (vehicle icon with a reference character 45 in FIG. 19), voice such as "There is a specialty shop for gardening-related products ahead. Poinsettia is popular in this season" may be outputted.

Note that displaying entire neighboring town information on the map is not realistic due to restriction in size of the display area, and so forth. Moreover, audio output of entire neighboring town information is also impossible due to temporal restriction and so forth. Thus, as described above, if town information matching the personal information such as hobby is selectively displayed or outputted in accordance with the attribute information on the vehicle side, information can be effectively presented even with display restriction, temporal restriction at the time of audio output, and so forth. Alternatively, in accordance with information about a target group included in the town information, that is, information regarding gender, age, and so forth, town information may be presented as being limited to a vehicle (driver) matching the target group.

(3) Provision of Support Information Including Traffic Information

The server device provides, for example, the vehicle with the flag value of 2 recorded in the provision destination management area (FIG. 17), that is, the vehicle transmitting vehicle information such as the vehicle type and the vehicle body color, as being included in the upload information, with traffic information such as the construction section and the restricted section. On the vehicle side receiving provision of the support information including the traffic information, it is possible to perform a process such as recalculation of a route for avoiding the construction section, the restricted section, and so forth regarding the traffic information.

Next, on the server device side acquiring the upload information, as exemplarily depicted in the vehicle position DB of FIG. 16, it is possible to grasp a vehicle position for each attribute in accordance with the attribute information included in the vehicle position data. If the vehicle position for each attribute can be grasped, it is possible to generate various distribution maps, such as in FIG. 20, for example. The distribution map in the drawing is a distribution map in which each vehicle is distinguished in accordance with the gender and age bracket. In the drawing, a vehicle driven by a female aged 20 to 34 years (F1 group) is denoted by hollow circle mark 411, a vehicle of a male aged the same (M1 group) is denoted by solid circle mark 412, a vehicle of a female aged 35 to 49 years (F2 group) is denoted by hatched circle mark 413, a vehicle of a male aged the same (M2 group) is denoted by dotted circle mark 414, another is denoted by double circle mark 415, a vehicle with its information undisclosed is denoted by square mark 416, and so forth.

If the vehicle position for each attribute can be grasped, for example, as in FIG. 21, only the vehicles being driven by females aged 20 to 34 years (F1 group) can be selectively displayed. Alternatively, although not depicted, a route map targeted for a plurality of vehicles being driven by females aged 20 to 34 years (F1 group) can be generated. According to these distribution map and route map, as for vehicles belonging to a specific group, for example, the vehicles being driven by females aged 20 to 34 years (F1 group), a trend of movement can be grasped. If this trend of movement is grasped, this can be very useful information in considering, for example, the installation place of a billboard of a shop or product, positional timing of electronically presenting service information during driving, and so forth.

Each vehicle using the above-configured vehicle position management system transmits, to the server device, various information as being included in the upload information, thereby allowing the right to receive provision of support information including service information to be acquired. According to this vehicle position management system, by providing support information including various service information other than the marker position data, it is possible to collect a large amount of information such as driver's personal information from the vehicle side.

In this manner, the vehicle position management system of the present embodiment can acquire various information from each vehicle as a reward for providing various service information helpful for driving to the vehicle side. For example, if the driver's personal information is collected, it is possible to grasp (identify) and manage the vehicle position for each attribute of the driver driving the vehicle. This information about the vehicle position for each attribute can become extremely effective information for contemplating, for example, selection of a sales location for products for young women or the like, selection of a setting location of a billboard for advertisement or the like.

Note that a case may be set in which a combination of destination information and personal information is included in the upload information. In this case, on the server device side, both of corresponding flag with the flag value of 1 and flag with the flag value of 3 may be put in parallel, of the flag value different from the flag value of 1 and the flag value of 3 may be set. And, as service information in this case, service information corresponding to the flag value of 1 and service information corresponding to the flag value of 3 may be both included to increase the amount of information. Alternatively, service information that is more advantageous compared with the service information corresponding to the flag value of 1 and the service information corresponding to the flag value of 3 may be provided. As more advantageous congestion information, for example, special information including information about a vacant route where congestion is avoidable can be thought. As more advantageous town information, for example, limited information such as a special discount on a product and so forth can be thought. Also in the case of a combination of other two types of flag values, a combination of three or more types of flag values and so forth, the same way of thinking as described above can be applied.

Service information such as control information for vehicle's automatic driving may be included in the support information. For example, a vehicle transmitting the upload information including the lateral shift amount with respect to the magnetic marker may be provided with control information such as a steering operation angle and an accelerator opening for the vehicle to travel along the road where magnetic markers are arrayed. In this case, vehicle's automatic traveling along the magnetic markers can be achieved by the control information included in the support information as service information. On the server device side, there is a merit in which the vehicle position can be accurately identified by acquiring the lateral shift amount.

Furthermore, data of each vehicle position has a possibility of helping process of analyzing and estimating a traffic situation, time zone, location, and so forth in which traffic accidents tend to occur. For example, by using artificial intelligence technology, the situation of occurrence of traffic accidents is preferably subjected to machine learning. If prediction of traffic accidents and so forth are possible, attention of each vehicle can be called at a stage before a traffic accident occurs, thereby allowing a reduction in traffic accidents. Furthermore, data of each vehicle position to which attribute information is linked has a possibility that traffic accidents, congestion and so forth can be more accurately predicted. This is because the frequency of occurrence of traffic accidents and so forth depends on the ages of drivers. In this manner, data of vehicle positions managed by the vehicle position management system is very useful data that helps society. According to the vehicle position management system of the present embodiment, information such as the position of each vehicle can be relatively easily collected, and useful data can be generated at low cost.

Note that other configurations and operations and effects are similar to those of the first embodiment.

In the foregoing, specific examples of the present invention are described in detail as in the embodiments, these specific examples merely disclose examples of technology included in the scope of claims for patent. Needless to say, the scope of claims for patent should not be restrictively construed based on the configuration, numerical values and so forth of the specific examples. The scope of claims for patent includes techniques acquired by variously modifying, changing, or combining as appropriate the above-described specific examples by using known techniques, knowledge of a person skilled in the art and so forth.

REFERENCE SIGNS LIST 1 vehicle position management system
10 magnetic marker
11 server device
111 marker database (marker DB)
113 map database (map DB)
115 vehicle position database (vehicle position DB)
117 upload information acquiring part (information acquiring part)
118 provision destination management area
119 support information providing part (information providing part)
15 RFID tag (wireless tag)

2 measurement unit
21 sensor array (detection unit)
212 detection processing circuit
32 control unit (selection operating part)
34 tag reader (marker identification information acquisition unit)
5 vehicle
6 navigation device

The invention claimed is:

1. A vehicle position management system comprising:
an information providing part which provides a vehicle with support information helpful for driving the vehicle;
a right granting part which grants an information acquisition right, which is a right to receive provision of the support information, to the vehicle;
a marker database which stores marker position information indicating a laying position of a magnetic marker, as being linked to marker identification information, the marker identification information identifying the magnetic marker laid in a road; and
a vehicle position identifying part which identifies a position of the vehicle by using the marker position information stored in the marker database, wherein
the right granting part, when upload information including the marker identification information which identifies the magnetic marker detected is acquired from a vehicle side detecting the magnetic marker, grants the information acquisition right to the vehicle associated with the upload information and deletes the information acquisition right when the information providing part provides the vehicle to which the information acquisition right has been granted with the support information, and
the vehicle position identifying part identifies the position of the vehicle associated with the upload information with reference to the laying position indicated by the marker position information to which the marker identification information included in the upload information is linked, among the marker position information stored in the marker database.

2. The vehicle position management system in claim 1, wherein the marker identification information is identification information of a wireless tag annexed to the magnetic marker.

3. The vehicle position management system in claim 1, wherein the support information includes the marker position information indicating the laying position of the magnetic marker.

4. The vehicle position management system in claim 1, wherein the vehicle includes a selection operating part for selectively setting information to be included in the upload information, in addition to the marker identification information, and
the information providing part varies a configuration of the support information to be provided to the vehicle side in accordance with a type and a combination of information included in the upload information acquired from the vehicle side.

5. The vehicle position management system in claim 1, comprising a map generating part which generates a vehicle map in which the position of the vehicle is associated on a map.

6. The vehicle position management system in claim 1, comprising a provision destination management area where identification information of the vehicle of a provision destination of the support information is recorded, wherein the right granting part grants the information acquisition right, which is the right to receive the support information, to the vehicle associated with the identification information by recording the identification information in the provision destination management area, and deletes the information acquisition right when the support information has been provided by deleting the identification information of the vehicle of the provision destination of the support information from the provision destination management area.

7. The vehicle position management system in claim 1, wherein the right granting part, when the upload information is acquired, records a flag value corresponding to a type of transmission information transmitted as included in the upload information in association with the identification information of the vehicle in the provision destination management area, and
the information providing part provides the support information in accordance with the flag value stored in association with the identification information in the provision destination management area when providing the support information to the vehicle associated with the identification information.

8. The vehicle position management system in claim 6, wherein the marker identification information is identification information of a wireless tag annexed to the magnetic marker.

9. The vehicle position management system in claim 7, wherein the marker identification information is identification information of a wireless tag annexed to the magnetic marker.

10. The vehicle position management system in claim 6, wherein the support information includes the marker position information indicating the laying position of the magnetic marker.

11. The vehicle position management system in claim 7, wherein the support information includes the marker position information indicating the laying position of the magnetic marker.

12. The vehicle position management system in claim 6, wherein the vehicle includes a selection operating part for selectively setting information to be included in the upload information, in addition to the marker identification information, and
the information providing part varies a configuration of the support information to be provided to the vehicle side in accordance with a type and a combination of information included in the upload information acquired from the vehicle side.

13. The vehicle position management system in claim 7, wherein the vehicle includes a selection operating part for selectively setting information to be included in the upload information, in addition to the marker identification information, and
the information providing part varies a configuration of the support information to be provided to the vehicle side in accordance with a type and a combination of information included in the upload information acquired from the vehicle side.

14. The vehicle position management system in claim 6, comprising a map generating part which generates a vehicle map in which the position of the vehicle is associated on a map.

15. The vehicle position management system in claim 6, wherein
the right granting part, when the upload information is acquired, records a flag value corresponding to a type of transmission information transmitted as included in the upload information in association with the identification information of the vehicle in the provision destination management area, and the information providing part provides the support information in accordance with the flag value stored in association with the identification information in the provision destination management area when providing the support information to the vehicle associated with the identification information.

\* \* \* \* \*